J. GRAF.
NATURAL ICE PRODUCER.
APPLICATION FILED SEPT. 30, 1916.

1,247,821.

Patented Nov. 27, 1917.

INVENTOR
Jacob Graf

UNITED STATES PATENT OFFICE.

JACOB GRAF, OF TOLEDO, OHIO.

NATURAL-ICE PRODUCER.

1,247,821.  Specification of Letters Patent.  Patented Nov. 27, 1917.

Application filed September 30, 1916. Serial No. 123,030.

*To all whom it may concern:*

Be it known that I, JACOB GRAF, a citizen of Switzerland, and a resident of Toledo, in the county of Lucas and State of Ohio, have invented a certain new and useful Natural-Ice Producer; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for producing ice. It has for its object to provide a means for spreading water over the surface of objects in order that a large surface of the water may be presented to cold air. The ice is frozen preferably in the winter time, although artificial means may be used for cooling the air surrounding the water and causing it to rapidly freeze.

The invention may be contained in many forms of constructions for producing ice, which will come within the purview of the claims hereinafter appended. To show the practicability of the invention I have selected one of such constructions as an example and shall describe it hereinafter. The construction selected is illustrated in the accompanying drawings.

Figure 1:
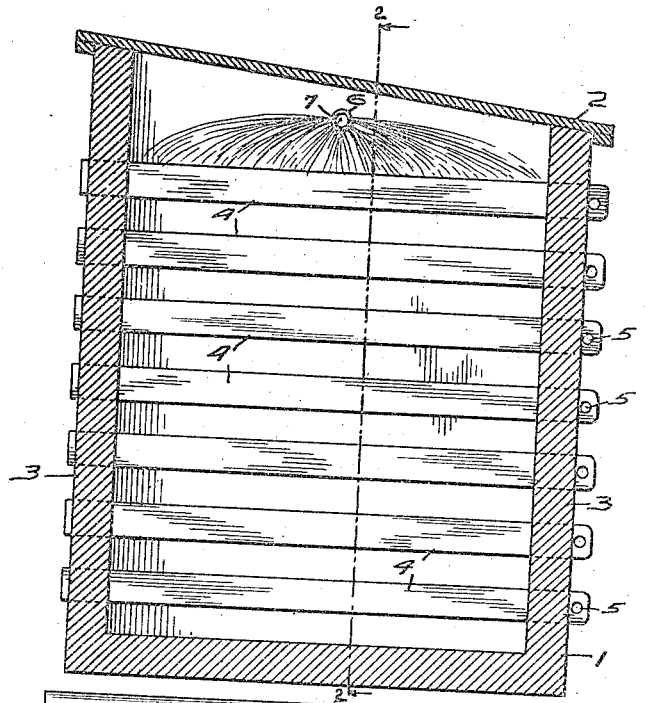
Figure 2:
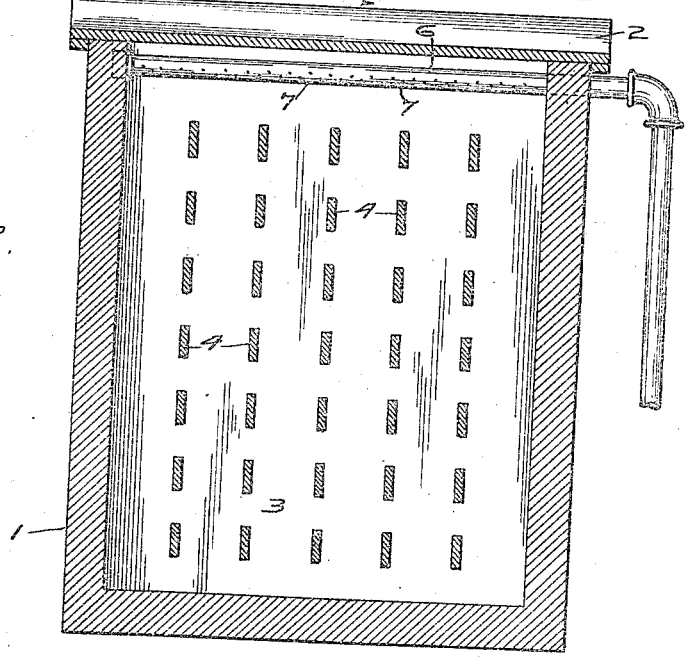

Figure 1 of the drawings illustrates a sectional view of a container and the means for producing the ice. Fig. 2 illustrates a section transverse to that shown in Fig. 1 taken on the line 2—2 indicated in Fig. 1.

1 is a container which is preferably formed of heat insulating material. It has a removable cover 2 which is preferably removed in cold winter weather when the ice is to be produced. The container is shown in the form of a shed having a removable roof 2. The end walls 3 are provided with slots through which extend bars 4. The bars 4 are arranged in tiers. The bars are preferably supported on their edges in the slots formed in the walls 3, that is, the flat sides of the bars are located in vertical planes. The ends of the bars 4 protrude through the end walls 3 in order that they may be removed, notwithstanding the fact that they are frozen in the ice that is formed.

One end of the bar may be struck with a heavy mallet in order to start the bar, and then the other end may be pulled out of the container 3. One end of each bar is provided with a hole 5 in which may be inserted a suitable instrument for the withdrawing of the bar from the ice and the container. A spray pipe 6 is located in the top of the container and above the bars. It preferably extends transverse the bars. It is provided with a plurality of needle holes 7 to cause the water to be finely sprayed on the bars. The water falling on the bars drips from one bar to the other in each tier of bars, and readily freezes on account of the large area of the surface of the water that is presented to the cold air. Icicles are first formed which gradually build up until the whole of the interior of the container is filled with ice. The flow of the water through the pipe 6 may then be stopped by a suitable valve and the top of the container 1 above the upper row of bars may be filled with sawdust and the cover 2 placed on the container. The bars 4 may then be removed from the container and the ice and then suitable temporary walls may be placed around the container and sawdust packed between the container and the temporary walls.

The construction selected and described may be greatly modified in the arrangement and manufacture of its parts and in the substitution of elements having equivalent functions and still contain the invention.

I claim:

1. In a natural ice producer, the combination of a container having a plurality of horizontal bars arranged in parallel planes and protruding through one of the walls of the container for removal of the bars, a pipe having spray openings located above the bars for spraying water over the surface of the bars.

2. In a natural ice producer, the combination of a container having a plurality of horizontal bars arranged in parallel planes and protruding through one of the walls of the container, the cross sections of the bars being oblong and the bars supported on edges in the end walls of the container, a pipe having spray openings for spraying water over the bars.

In testimony whereof, I have hereunto signed my name to this specification.

JACOB GRAF.

Copies of this patent may be obtained for five cents each, by addressing the "Commissioner of Patents, Washington, D. C."